J. K. STEWART.
MAGNETIC SPEEDOMETER.
APPLICATION FILED NOV. 5, 1910.

1,077,438.

Patented Nov. 4, 1913.

UNITED STATES PATENT OFFICE.

JOHN K. STEWART, OF CHICAGO, ILLINOIS, ASSIGNOR TO STEWART-WARNER SPEEDOMETER CORPORATION, OF VIRGINIA.

MAGNETIC SPEEDOMETER.

1,077,438.  Specification of Letters Patent.  Patented Nov. 4, 1913.

Application filed November 5, 1910. Serial No. 590,778.

*To all whom it may concern:*

Be it known that I, JOHN K. STEWART, a citizen of the United States, residing at Chicago, in the county of Cook and State of Illinois, have invented new and useful Improvements in Magnetic Speedometers, of which the following is a specification, reference being had to the accompanying drawings, forming a part thereof.

The purpose of this invention is to provide within a speedometer case means sensitive to temperature changes for automatically regulating the strength of the spring against which the speed-indicating mechanism is deflected.

Figure 1:
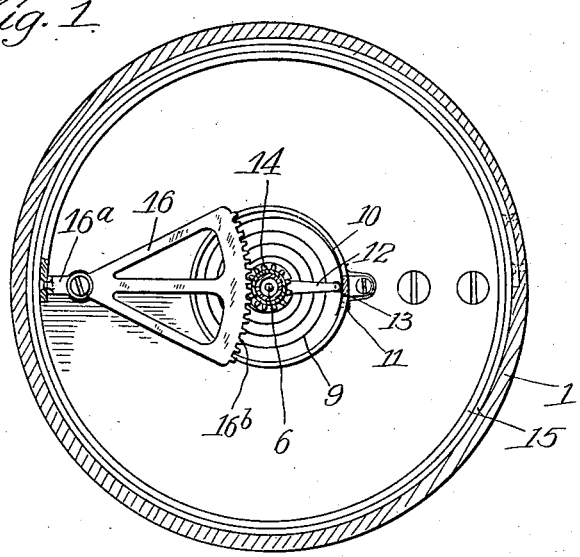
Figure 2:
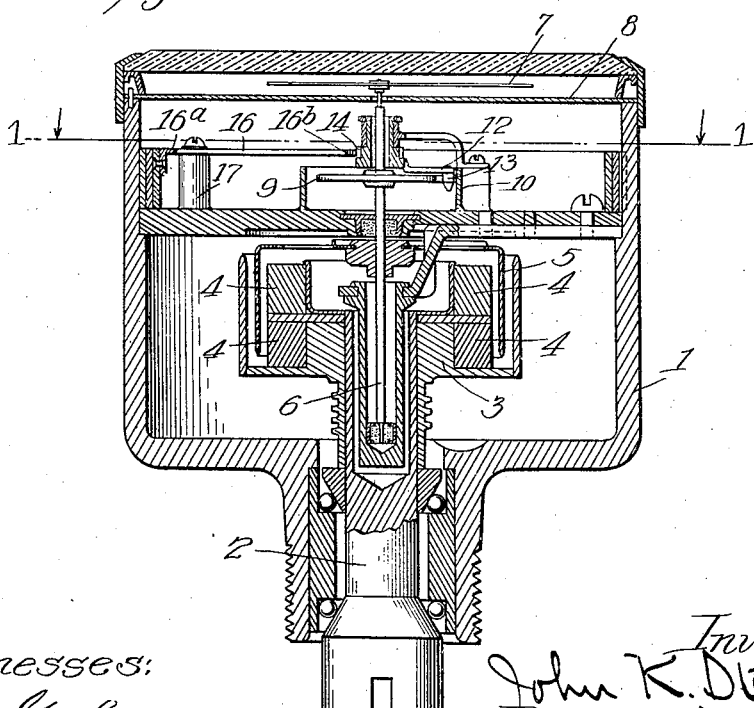

In the drawings:—Figure 1 is an interior plan view of that portion of the speedometer containing the parts embodying the invention, being a section at the line 1—1 on Fig. 2. Fig. 2 is an axial section of a speedometer showing the relation of the parts constituting the invention to the other parts of the instrument.

This device is intended for use in the well-known type of speed-indicating device operated by the principle of "magnetic drag".

As illustrated in Fig. 2, 1 is the speedometer case. 2 is the driving shaft, to the upper end of which is secured the magnet-carrier, 3, with its magnets, 4. Adjacent to the magnets and separated therefrom by a slight space is the inverted cup-shaped element, 5, journaled concentrically with the rotatable magnets and formed of some non-magnetic metal such as copper or aluminum. The spindle, 6, of this element carries also the indicating needle, 7, in position for traversing the dial indicated at 8, on Fig. 2. A hair spring, 9, having its inner end fastened to the spindle, 6, and its outer end secured to a part fixed on the case serves to bias the needle toward the zero point, holding it there until the non-magnetic element, 5, carried on the same spindle is deflected by the magnetic drag of the rotating magnets, 4. It is well known that the amount or strength of this drag depends directly upon the electrical conductivity of the element, 5, and also upon the velocity of rotation of the magnets, 4. Obviously, a change in either of these determining factors will effect a change in the indication of the needle, 7. It is through the effect of changes in velocity that the instrument becomes a speed indicator, and the purpose of the present invention is to prevent variations of electrical conductivity from affecting and vitiating the speed indication thus obtained. Such variations of electrical conductivity are caused by variations of temperature, an increase of temperature causing a decrease in the conductivity of the metallic element, 5.

Since the magnetic drag operates always in opposition to the strength of the hair spring, 9, it would be sufficient to decrease the stiffness by increasing the operative length of this spring in proportion to the decrease of magnetic drag occasioned by the decrease of conductivity above recited. For accomplishing automatically such variation in the operative length of the spring, it is mounted within a circular container, 10, concentric with the spindle, 6, having one end secured thereto by means of a rivet or screw, 11. Also concentric with the spindle there is mounted a small radius arm, 12, carrying at its outer end a roller, 13, in position to bear against the outer coil of the hair spring and to press it against the inside wall of the container, 10. The other end of the arm is provided with a small spur gear 14 rigid with it. Just within the circular casing, 1, a metallic strip, 15, is coiled preferably close against the casing,— and with the coils touching each other. The outer end of this strip is rigidly secured to the casing, and the inner end is fastened to the short end, 16ª, of the segmental lever, 16. A series of gear teeth is provided on this lever at 16ᵇ, for meshing with the spur gear, 14. The lever, 16, being fulcrumed upon a stud, 17, nearest the end, 16ª, will undergo a considerable angular movement in response to even a slight variation in the length of the coil, 15, due to change of temperature.

As shown, an increase of temperature which would tend to elongate the metallic strip, 15, would move the parts so as to simultaneously elongate the effective length of the hair spring, 9,—that is, its length between its connection with the spindle, 6, and the bearing point of the roller, 13. This, as above noted, would decrease the resistance of the spring to deflection of the parts by the magnetic drag which would also have been decreased in effect by the increase of temperature. Thus, when the parts are properly proportioned, changes of temperature, while varying the force upon which the operation of the instrument depends, at the same time automatically correct the action of the parts so that a faithful indication of speed is still furnished by them.

I claim:—

1. In a speed indicating device, a scale member, a pointer associated therewith, a spindle connected to one of these parts, a spring having one end connected to said spindle, a split ring device sensitive to variations in atmospheric temperature, and having one end fixed, connections between the other end of said spring and the free end of said split ring device, and means operated by the shaft, the speed of which is to be indicated, for rotatively moving said spindle against the action of said spring.

2. In a speed indicating device, a scale member, a pointer associated therewith, a spindle connected to one of these parts, a spring connected to said spindle, a thermostatic device, connections between said thermostatic device and said spring, means operated by the shaft, the speed of which is to be indicated, for creating a rotating magnetic field, and means connected to the spindle and acted on by the magnetic field to rotatively displace said spindle against the action of said spring.

3. In a speed indicating device, a magnet and a magnetic mass, a member interposed therebetween to be cut by the lines of force in the magnetic field thereof, a spindle connected to said member, a spring connected at one end to said spindle, a thermostatic device, connections between said thermostatic device and said spring, and means for imparting rotation to the magnetic mass.

4. In a speed indicating device, means for creating a rotating magnetic field, a member arranged to be rotatively displaced by said rotating magnetic field, a spindle carrying said member, a spring to yieldingly resist the rotative displacement of said member, a thermostatic device and connections between said thermostatic device and said spring to vary the effective tension of said spring by and in accordance with variations in atmospheric temperature.

5. In a speedometer, in combination with a rotating magnet and a non-magnetic member mounted for oscillation in the magnetic field; a metallic spiral having one end fixed; a spring fixed at one end and operatively connected with said member for biasing the latter to a position of rest; means for holding the spring fixed at a point intermediate its ends for limiting its effective length, said means comprising a part connected with the free end of the metallic spiral for movement thereby along the spring for a distance from its fixed end.

6. In a speedometer, in combination with a rotating magnet and a non-magnetic member mounted for oscillation in the magnetic field; a metallic spiral having one end fixed and means by which it is circumferentially restrained; a spring fixed at one end and operatively connected with said member for biasing the latter to a position of rest; means for holding the spring fixed at a point intermediate its ends for limiting its effective length, said means comprising a part connected with the free end of the metallic spiral for movement thereby along the spring for a distance from its fixed end.

7. In a speedometer, in combination with a rotating magnet and a non-magnetic member mounted for oscillation in a magnetic field; a metallic spiral having one end fixed; a spring having one end operatively connected with said member for biasing the latter to a position of rest; a circular container for the spring, and an element mounted for movement about the axis of such container having means for binding the spring against the latter to limit its effective length, and means connecting said element with the free end of the metallic spiral for movement therewith.

8. In a speedometer in combination with a rotating magnet and a non-magnetic member mounted for oscillation in a magnetic field; a metallic spiral having one end fixed and means by which it is circumferentially restrained; a spring having one end operatively connected with said member for biasing the latter to a position of rest; a circular container for the spring, and an element mounted for movement about the axis of such container having means for binding the spring against the latter to limit the effective length of the spring, and means connecting said element with the free end of the metallic spiral for movement therewith.

9. In a speedometer, in combination with a rotating magnet and a non-magnetic member mounted for oscillation in the magnetic field; a metallic spiral having one end fixed; a spring having one end operatively connected with said member for biasing the latter to a position of rest; a circular container for the spring; a radius arm pivoted at the center of the container; a roller journaled on the radius arm in position to retain the free end of the spring against the container wall, and means connecting the radius arm with the free end of the metallic spiral for movement therewith.

10. In a speedometer, in combination with a rotating magnet and a non-magnetic member mounted for oscillation in the magnetic field; a metallic spiral having one end fixed; a spring having one end operatively connected with said member for biasing the latter to a position of rest; a circular container for the spring; a radius arm pivoted at the center of the container; a roller journaled on the radius arm in position to bind the spring intermediate its ends against the wall of the container; a pinion rigid with the radius arm at its pivotal mounting, and a gear device positioned to mesh with the pinion and connected to the free end of the metallic spiral for movement therewith.

11. In a speedometer, in combination with a rotating magnet and a non-magnetic member mounted for oscillation in the magnetic field; a metallic spiral having one end fixed; a spring having one end operatively connected with said member for biasing the latter to a position of rest; a circular container for the spring; a radius arm pivoted at the center of the container; a roller journaled on the radius arm in position to bind the spring intermediate its ends against the wall of the container; a pinion rigid with the radius arm at its pivotal mounting; a gear segment journaled in position to mesh with the pinion, and means connecting said gear segment to the free end of the metallic spiral for movement therewith.

12. In a speedometer, in combination with a rotating magnet and a non-magnetic member mounted for oscillation in the magnetic field; a metallic spiral having one end fixed; a spring having one end operatively connected with said member for biasing the latter to a position of rest; a circular container for the spring; a radius arm pivoted at the center of the container; a roller journaled on the radius arm in position to bind the spring intermediate its ends against the wall of the container; a pinion rigid with the radius arm at its pivotal mounting, and a lever fulcrumed between its ends and having a gear segment formed on one end in position to mesh with the pinion, the free end of the metallic spiral being connected to the other end of the lever for moving it.

In testimony whereof, I have hereunto set my hand in the presence of two witnesses, at Chicago, Illinois, this 29th day of October 1910.

JOHN K. STEWART.

Witnesses:
G. L. MEYER, Jr.,
STANHOPE HUDSON.